(12) United States Patent
Young et al.

(10) Patent No.: US 10,766,449 B2
(45) Date of Patent: Sep. 8, 2020

(54) AIRBAG MODULE ASSEMBLY

(71) Applicant: Key Safety Systems, Inc., Sterling Heights, MI (US)

(72) Inventors: Jeffrey Young, Bruce Township, MI (US); Jheanell Johnson, Royal Oak, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 16/202,420

(22) Filed: Nov. 28, 2018

(65) Prior Publication Data

US 2020/0164829 A1     May 28, 2020

(51) Int. Cl.
| | |
|---|---|
| *B60R 21/239* | (2006.01) |
| *B60R 21/2338* | (2011.01) |
| *B60R 21/237* | (2006.01) |
| *B60R 21/215* | (2011.01) |

(52) U.S. Cl.
CPC .......... *B60R 21/239* (2013.01); *B60R 21/215* (2013.01); *B60R 21/237* (2013.01); *B60R 21/2338* (2013.01); *B60R 2021/2395* (2013.01)

(58) Field of Classification Search
CPC . B60R 21/239; B60R 21/2338; B60R 21/215; B60R 21/237; B60R 2021/2395; B60R 2021/23382; B60R 2021/23384; B60R 2021/23386; B60R 2021/23388
USPC ......................................................... 280/739
See application file for complete search history.

(56) References Cited

U.S. PATENT DOCUMENTS

| | | | |
|---|---|---|---|
| 5,762,367 A | 6/1998 | Wolanin | |
| 6,918,614 B2 * | 7/2005 | Ryan | B60R 21/233 |
| | | | 280/736 |
| 7,762,584 B2 * | 7/2010 | Morita | B60R 21/239 |
| | | | 102/531 |
| 8,322,748 B2 | 12/2012 | Kazuhiro et al. | |
| 9,776,591 B1 * | 10/2017 | Jeong | B60R 21/2338 |
| 2007/0205590 A1 * | 9/2007 | Klinkenberger | B60R 21/233 |
| | | | 280/743.2 |
| 2010/0090445 A1 * | 4/2010 | Williams | B60R 21/2338 |
| | | | 280/728.2 |
| 2013/0076012 A1 * | 3/2013 | Wook/Kwon | B60R 21/239 |
| | | | 280/740 |
| 2013/0334801 A1 * | 12/2013 | Williams | B60R 21/239 |
| | | | 280/739 |
| 2014/0151989 A1 * | 6/2014 | Iwamoto | B60R 21/239 |
| | | | 280/743.2 |

(Continued)

*Primary Examiner* — Ruth Ilan
*Assistant Examiner* — Kurtis Nielson
(74) *Attorney, Agent, or Firm* — Meunier Carlin & Curfman LLC

(57) ABSTRACT

An airbag module assembly has an airbag cushion with at least one vent, a housing structure for receiving the airbag cushion, a housing cover for attachment to the housing structure, a vent connector connected to the vent, a pin puller mechanism with a retractable pin, and a flexible conduit extending from the airbag cushion adjacent the vent to the pin puller mechanism. The vent connector extends inside the conduit to a looped end for attachment to the retractable pin. The vent connector can be a rope or wire. The vent is initially in a closed position during deployment of the airbag. The airbag cushion is folded about the conduit during assembly and the vent connector is configured to pass through the flexible conduit when the airbag cushion is folded.

15 Claims, 14 Drawing Sheets

(56) References Cited

U.S. PATENT DOCUMENTS

| | | | |
|---|---|---|---|
| 2014/0306434 A1* | 10/2014 | Jang | B60R 21/239 280/739 |
| 2015/0266447 A1* | 9/2015 | Hiruta | B60R 21/203 280/731 |
| 2016/0009240 A1* | 1/2016 | Choi | B60R 21/239 280/728.2 |
| 2018/0001864 A1* | 1/2018 | Collazo Gomez | B60R 21/26 |

* cited by examiner

AIRBAG MODULE ASSEMBLY

TECHNICAL FIELD

The present invention relates to airbag cushion module assemblies generally, more particularly to those airbag cushions employing tethers to control or adjust deployment conditions.

BACKGROUND OF THE INVENTION

A typical vehicle includes a driver airbag and the passenger airbag. Each of these airbags should be designed to protect occupants of varying sizes. An airbag designed to inflate at a relatively high pressure may be adequate to protect a large-size occupant in a frontal crash however the same airbag may not provide optimum protection for the smaller sized occupant. One method of designing a smart-airbag is to include a vent mechanism within the structure of the airbag. This vent for example is configured to remain closed so that the airbag can achieve its higher designed pressure to protect the large-sized occupant. The vent is also configured to be open enabling the inflation gas to escape thereby lowering the internal pressure of the airbag to more optimally protect the small-sized occupant. Some controllable vents are configured to initially be open and then moved to a closed position.

To effectuate vent control, airbags employ vent control mechanisms which include rope, wire, string, plastic strips or even convention fabric tethers with looped ends affixed to a retractable pin. Collectively, these rope, wire, string, plastic strips, or conventional fabric tethers are referred to as vent connectors. The retractable pin assemblies, one of which is shown in U.S. Pat. No. 9,776,591, can be solenoids that actuate on an electrical signal or pyrotechnic devices actuated by a sensor to fire a squib or actuator to discharge gases to move a piston causing the pin to retract and release the held looped end of the tether or vent connector. Often, the vent connector is partially located inside the folded airbag cushion inside the airbag module. These sensor activated pin puller release mechanisms are extremely reliable.

The airbag is adjustably controlled by the one or more vent connectors which are generally folded as the airbag cushion is folded. The folded cushion is then compactly placed in a container or module assembly for installation into a vehicle. The module assembly generally has a housing structure with a defined cavity or receiving chamber to hold the folded cushion. The module assembly further can employ a top cover or panel to encase the folded cushion. Prior art FIG. 1 shows a generic airbag with a conventional tethered vent coupled to a pin puller mechanism located exterior of the airbag. Typically, the pin puller mechanism is secured to a housing of an air bag module. In prior art FIG. 1A, the tether is shown released from the pin puller Often the size of the uninflated folded airbag cushion is larger than the receiving chamber of the housing structure, and in fact the folded cushion must be tightly tucked into the module housing with the top cover squeezing and packing the folded cushion inside the assembly. When this occurs, the vent connector can be entangled or caught on an object such that the airbag inflation can be altered and control of the vent delayed.

The present invention as described hereinafter provides a unique way to accommodate tightly packed airbag cushions while insuring the vent connector cannot become entangled on deployment.

SUMMARY OF THE INVENTION

An airbag module assembly has an airbag cushion with at least one vent, a housing structure for receiving the airbag cushion, a housing cover for attachment to the housing structure, a vent connector connected to the vent, a pin puller mechanism with a retractable pin, and a flexible conduit extending from the airbag cushion adjacent the vent to the pin puller mechanism. The vent connector extends inside the conduit to a looped end for attachment to the retractable pin. The vent connector tether can be a rope or wire. The vent is initially in a closed position during deployment of the airbag. The airbag cushion is folded about the conduit during assembly and the vent connector is configured to pass through the flexible conduit when the airbag cushion is folded.

The pin puller mechanism is attached to a mounting bracket or clip external of the housing structure. Alternatively, the pin puller mechanism can be attached to a mounting bracket or clip inside the housing structure.

The flexible conduit extends externally along an outer surface of the airbag cushion and passes through an opening in the housing. The conduit is fixed to the airbag cushion at an end near the vent. The conduit has a length extending from the attached end on the vent to the housing and sufficient to follow along the outer surface of the inflated airbag on deployment.

The looped end of the vent connector releases from the pin on activation of the pin puller. The release of the vent connector allows the closed airbag vent to open to vent inflation gases. The pin puller mechanism can have a pyrotechnic actuator or a solenoid actuator.

BRIEF DESCRIPTION OF THE DRAWINGS

The invention will be described by way of example and with reference to the accompanying drawings in which.

DETAILED DESCRIPTION OF THE INVENTION

Figure 1:
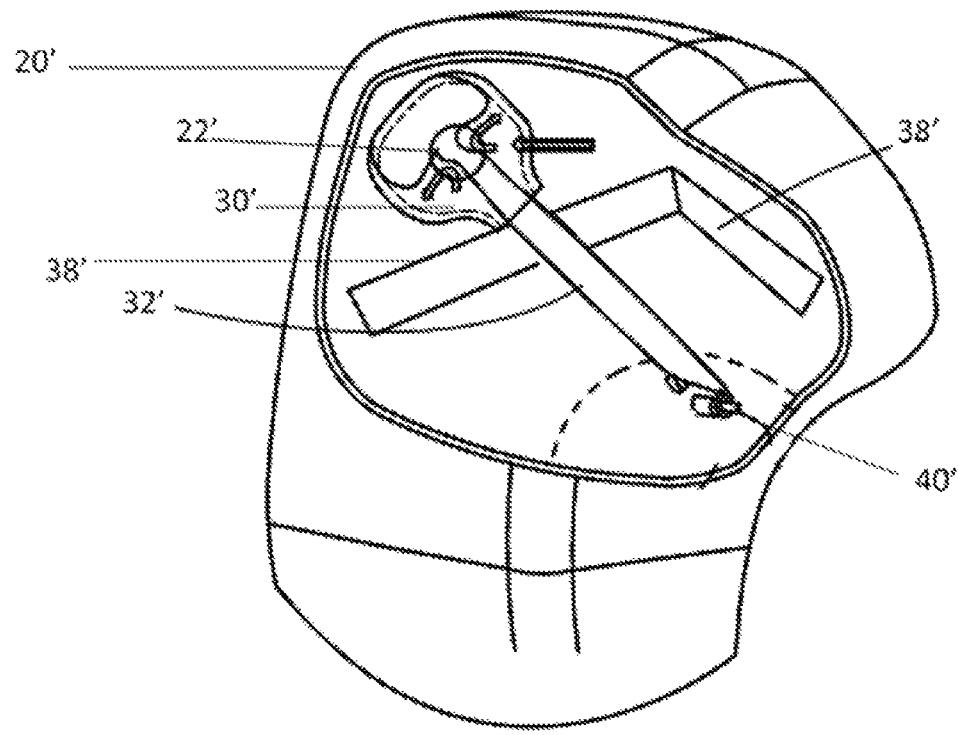
FIGS. 1 and 1A show a conventional prior art airbag and tethered vent in an open and closed position. in puller.
Figure 1A:
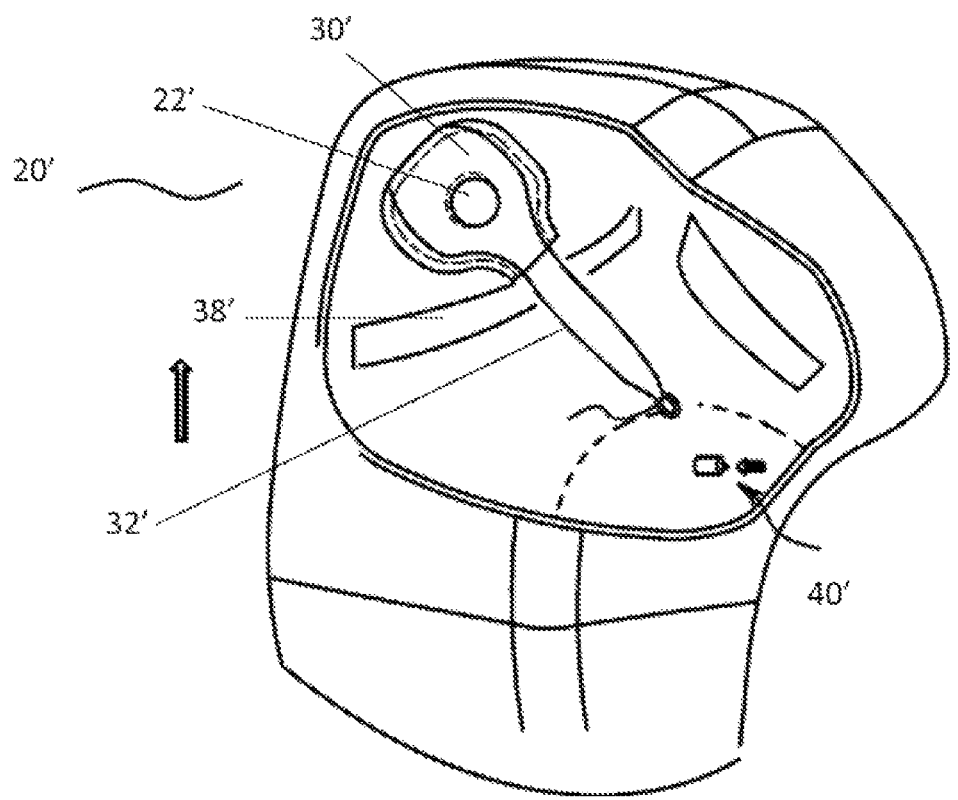

Referring back to prior art FIGS. 1 and 1A, a conventional airbag 20' is shown with tether 38' and a vent 22' with a tethered vent cover 30' and vent connector 32' connected to a pin puller 40' release mechanism. Vents of this type can be either initially open and closed on deployment or initially closed and then opened on deployment dependent on the design issue being addressed. The most important aspect of the movement of the vent from open to closed or vice versa is reliability. In most airbag designs, the uninflated cushion or airbag is folded into a compact size and stuffed into an airbag module or housing.

Figure 2:
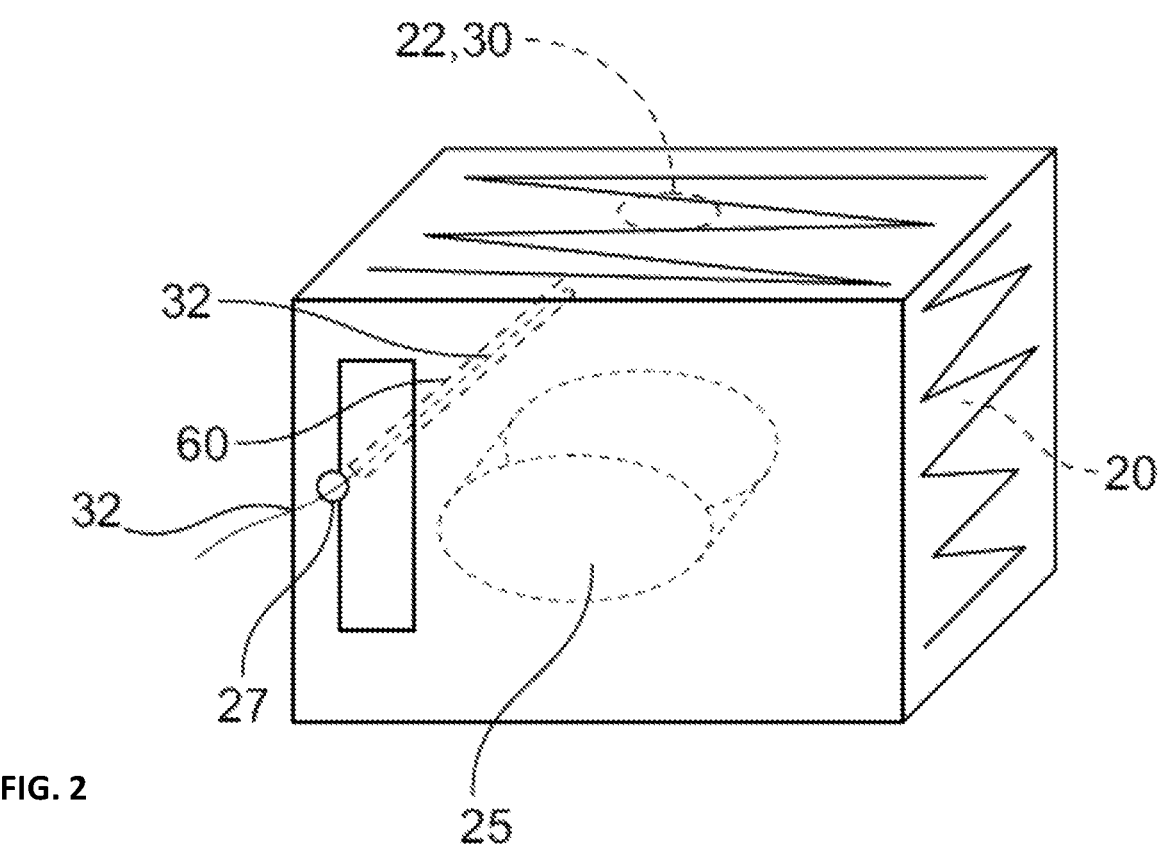
FIG. 2 shows an exemplary folded airbag with the vent connector of the present invention.

FIG. 2 demonstrates diagrammatically how an exemplary bulky airbag 20 is folded and packed into a square shape. As one can appreciate, the vent connector 32 connecting the vent cover 30 to a release mechanism or pin puller 40 can be tangled in the airbag folds and when this occurs the reliability of the vent cover 30 moving from open to closed vent 22 or vice versa at the correct time can be an issue. As shown in FIG. 2, an airbag 20 with an inflator 25 and a vent cover 30 connected to a vent connector 32 of the present invention provides a unique solution that overcomes these issues. The vent connector 32 connects to the vent 22 opening or closing feature and extends to a pin puller. This connector extending form the vent cover 30 to a pin puller mechanism 40 prevents any entanglement as is shown and discussed in the written description as follows.

Figure 3:
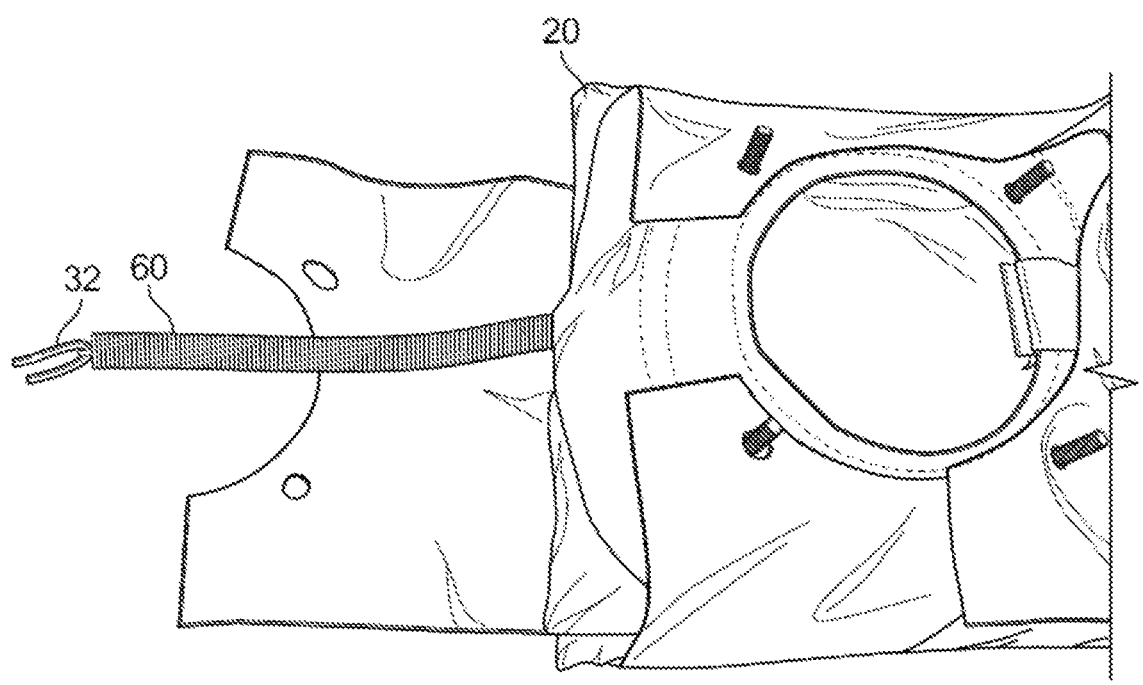
FIG. 3 is a top view of the airbag of the present invention with a vent and vent connector.

As better shown in FIG. 3, the folded airbag 20 of the present invention shows the vent connector 32 with the vent connector 32 internally housed in the conduit 60.

Figure 4:
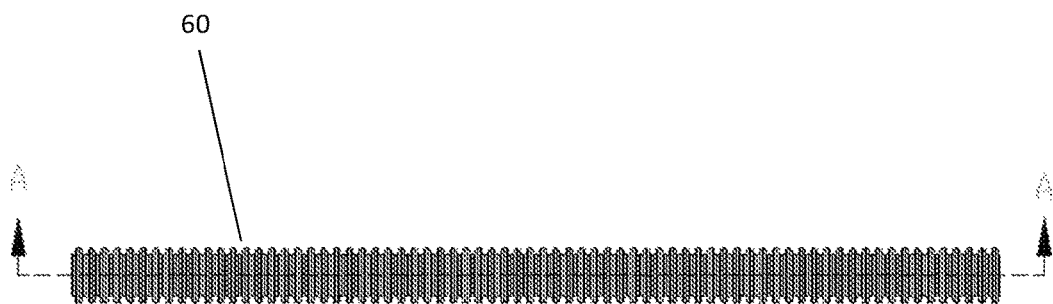
FIG. 4 is a plan view of a tube portion of the vent connector.
Figure 5:
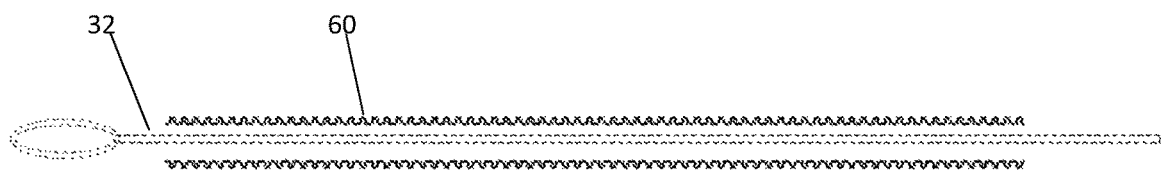
FIG. 5 is a cross-sectional view of the vent connector showing the flexible outer tube and a wire or rope with a looped end shown in dashed lines.

As shown in FIGS. 4 and 5, the conduit 60 is a flexible corrugated plastic tube. The conduit 60 can be a smooth tube or a rubber hose or a similar flexible hollow tube as long as it avoids or minimizes kinking and entanglement when bent allowing the vent connector 32 to move freely.

Figure 6:
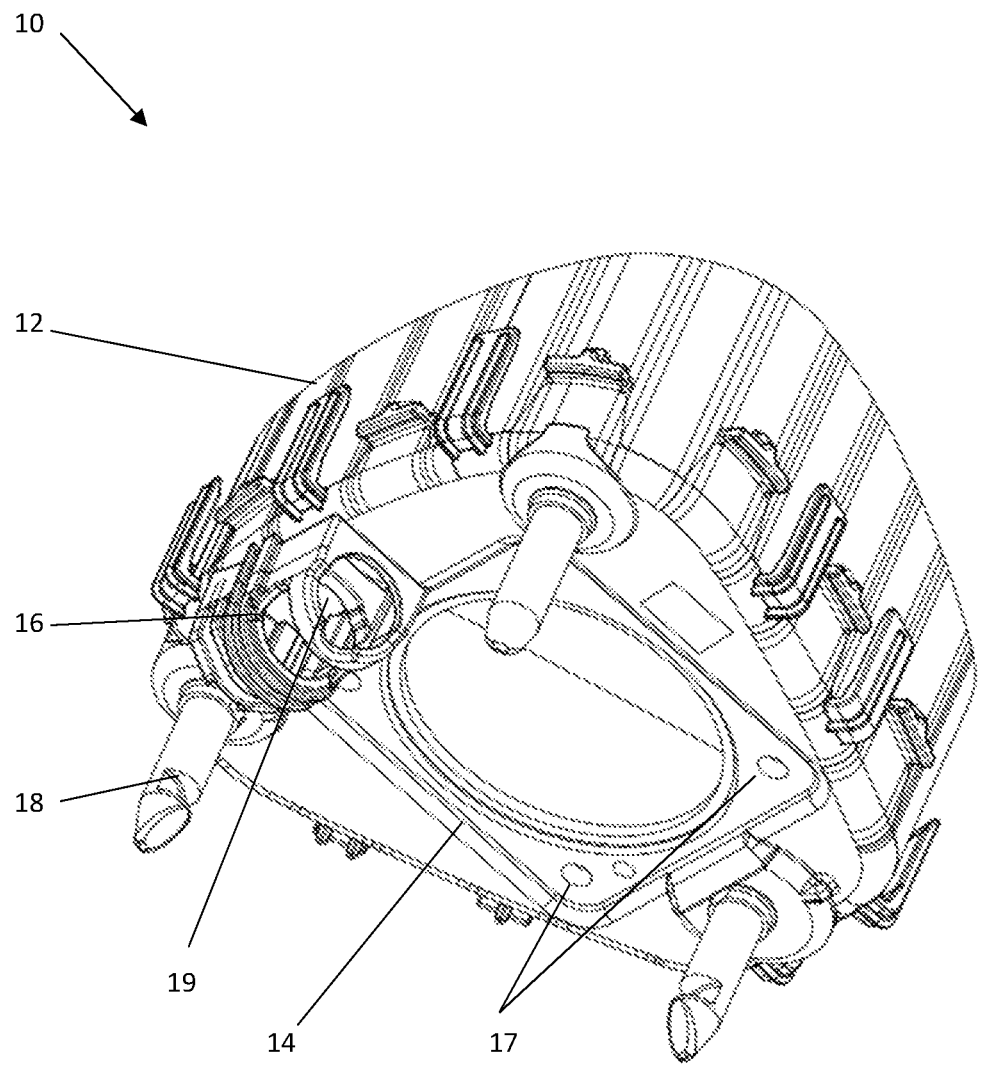
FIG. 6 is a perspective view of an exemplary airbag housing showing the bottom of the housing structure and the top cover attached to the housing structure.
Figure 7:
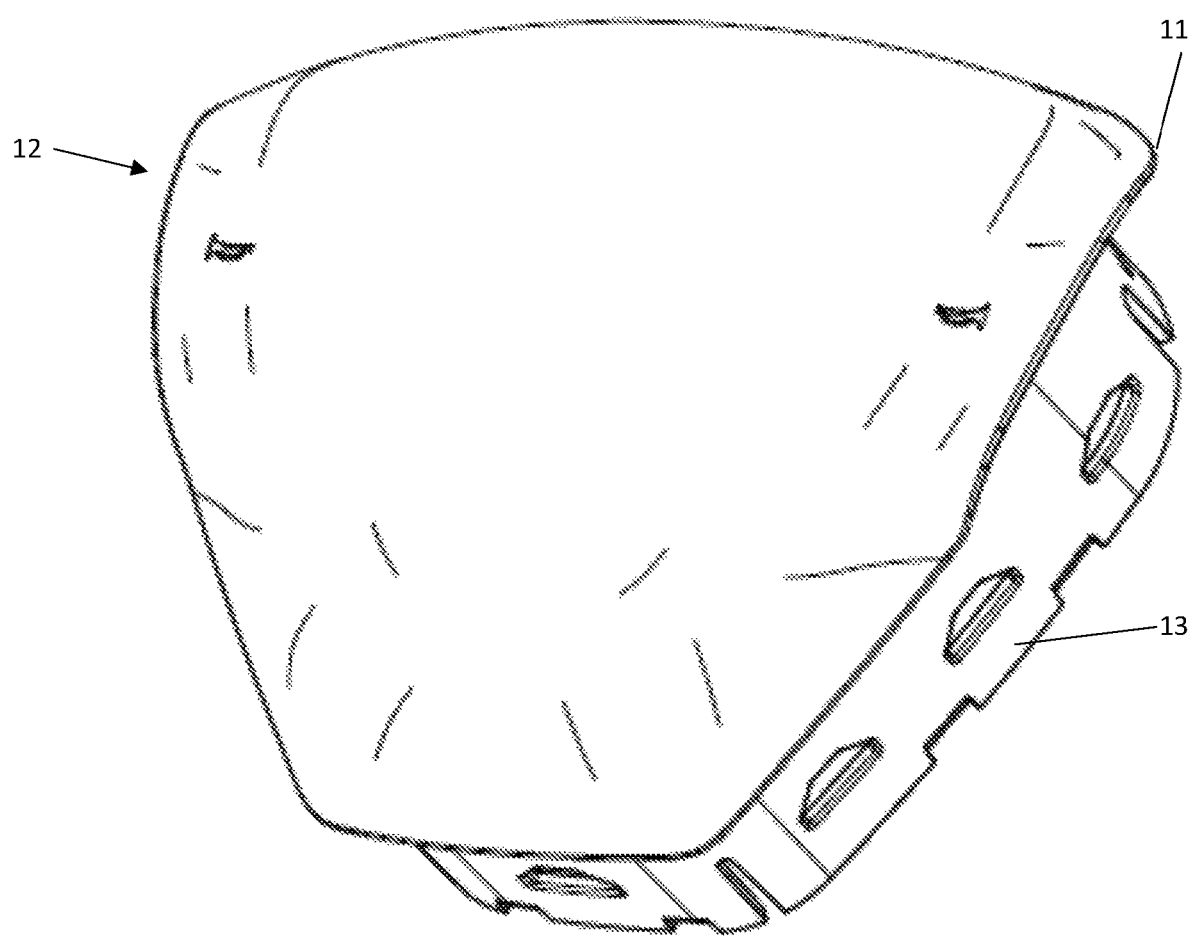
FIG. 7 is a perspective view of the top cover.

With reference to FIGS. 6-18, an exemplary airbag module assembly made according to the present invention is illustrated. As shown in FIGS. 6 and 7, the airbag module assembly 10 has a top cover 12 and a housing structure 14. The housing structure 14, as illustrated, has a plurality of posts 18 for attachment to a vehicle structure. In the exemplary embodiment, this airbag module assembly 10 is configured to fit on a driver's side steering wheel assembly in a known manner. It is understood that the airbag module assembly 10 of the present invention can be used in a number of configurations, not limited to a driver side airbag module. For example, the airbag module assembly of the present invention can be incorporated into a passenger side airbag, a seat airbag, a door airbag, even a curtain airbag if so required. The important thing to note is the airbag module assembly 10 simply needs to have a base structure or housing structure 14 for receiving an airbag cushion. As illustrated, the lower of bottom surface 14a of the housing structure 14 has a bracket assembly 16 as shown for receiving a pin puller mechanism. Additionally, the housing structure 14 has a plurality of holes 17, as illustrated, 4 holes are shown around a large central opening 19. This is for attachment of the airbag cushion on assembly. Opening 19, in housing plate 14b provides an aperture for an airbag tether to be extended through the housing 14.

With reference to FIG. 7, the airbag cover 12 is illustrated, the airbag cover has an overhanging top 11 covering a peripheral wall 13, the peripheral wall 13 has a plurality of notches which upon assembly will engage projections of the housing structure 14, so that when the top cover 12 is pressed onto the housing structure 14, it will snap into place fixing the two parts together.

Figure 8:
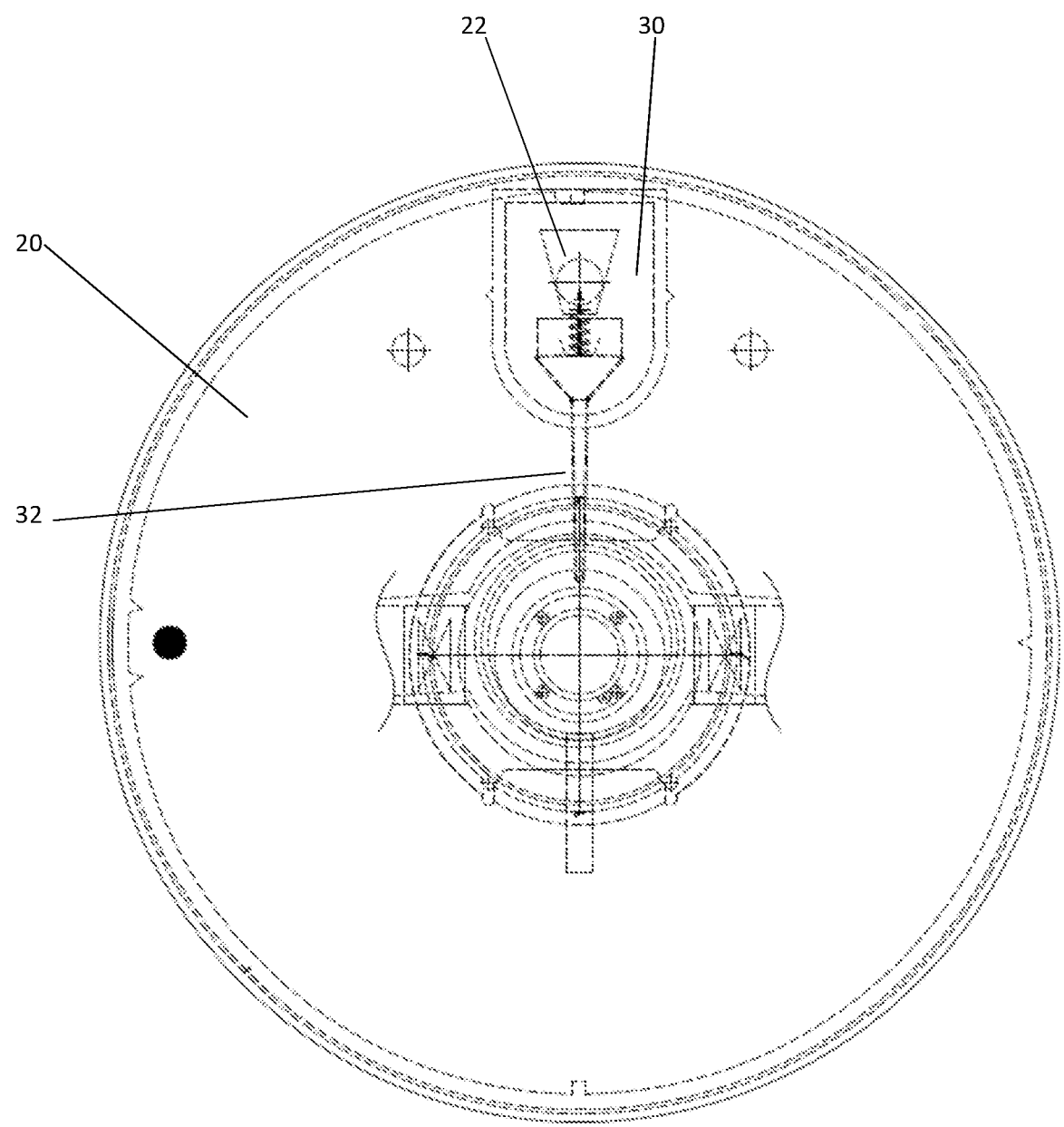
FIG. 8 is a plan view of an exemplary airbag cushion with a tethered vent.

With reference to FIG. 8, a top or plan view of an exemplary airbag cushion is illustrated. As shown, the airbag cushion 20 for a driver's side is typically a circular or annular configuration. The airbag cushion 20 will have an upper surface and a lower surface. In the illustration, the airbag cushion 20 has an opening 22 shown in dashed lines. This opening 22 is covered by a vent cover 30, the vent cover 30 is in a normally closed position. With reference to the vent cover extending therefrom is a rope or wire vent connector 32. This rope or wire vent connector 32 extends away from the vent cover 30 and as will be discussed later is used to release the vent cover 30 from the closed position to an open position when activated.

Figure 9:
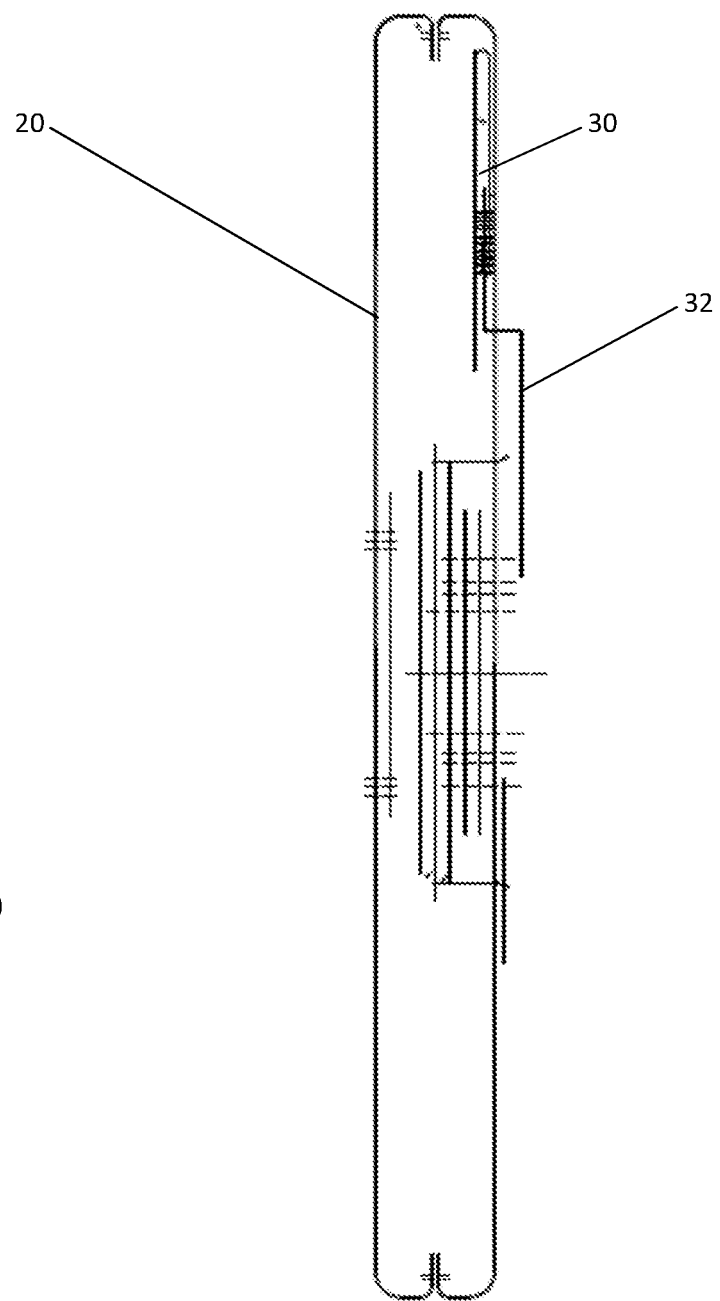
FIG. 9 is a side view of the airbag cushion of FIG. 3.

A side view of the airbag cushion 20 is shown in FIG. 9 with the vent cover 30 and vent connector 32.

Figure 10:
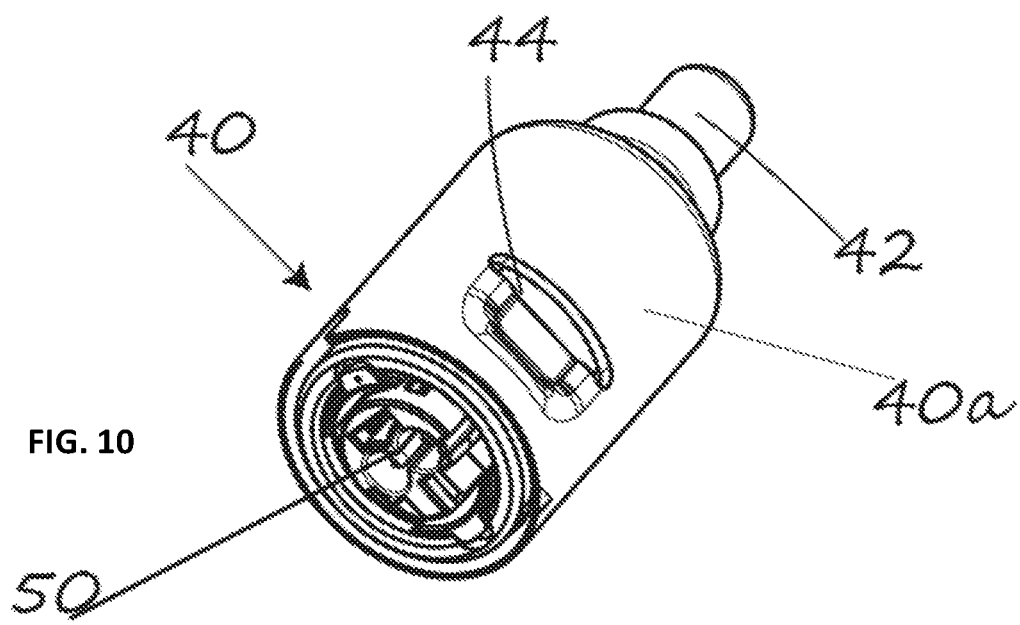
FIG. 10 is a perspective view of the pin puller mechanism.

With reference to FIG. 10, a pin puller mechanism 40 is illustrated. The pin puller mechanism 40 houses a pyrotechnic device internal of the cylindrical shaped housing 41 of the pin puller mechanism 40. On each side of the housing 40A is an indentation or retaining clip aperture 44. The retaining clip aperture 44 is designed to be held by retaining clips on the bracket assembly 16.

Figure 11:
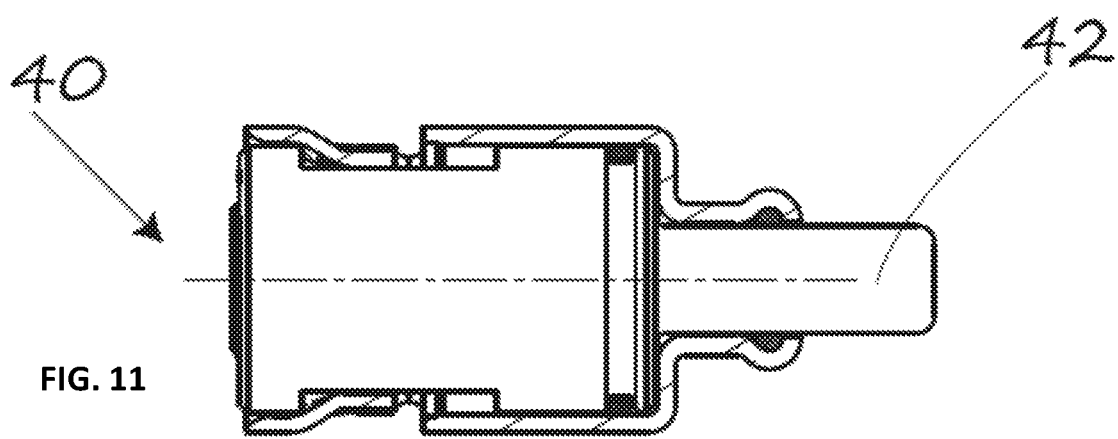
FIG. 11 is a cross sectional view of the pin puller mechanism per-activation.
Figure 12:
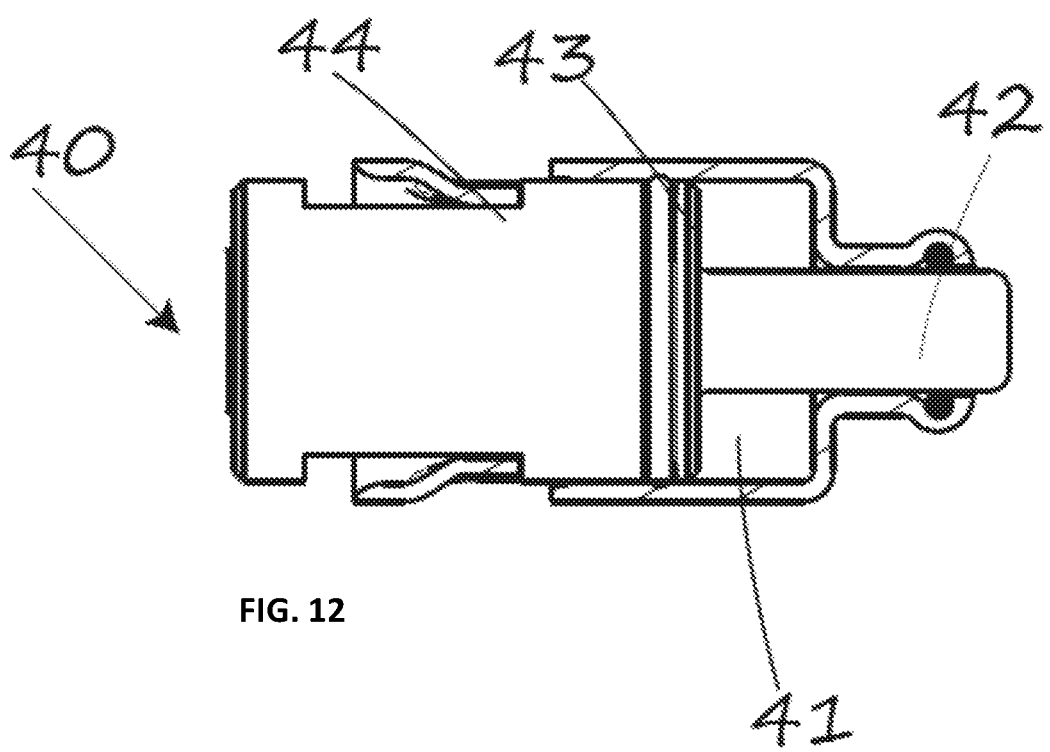
FIG. 12 is a cross sectional view of the pin puller mechanism post-activation.
Figure 13:
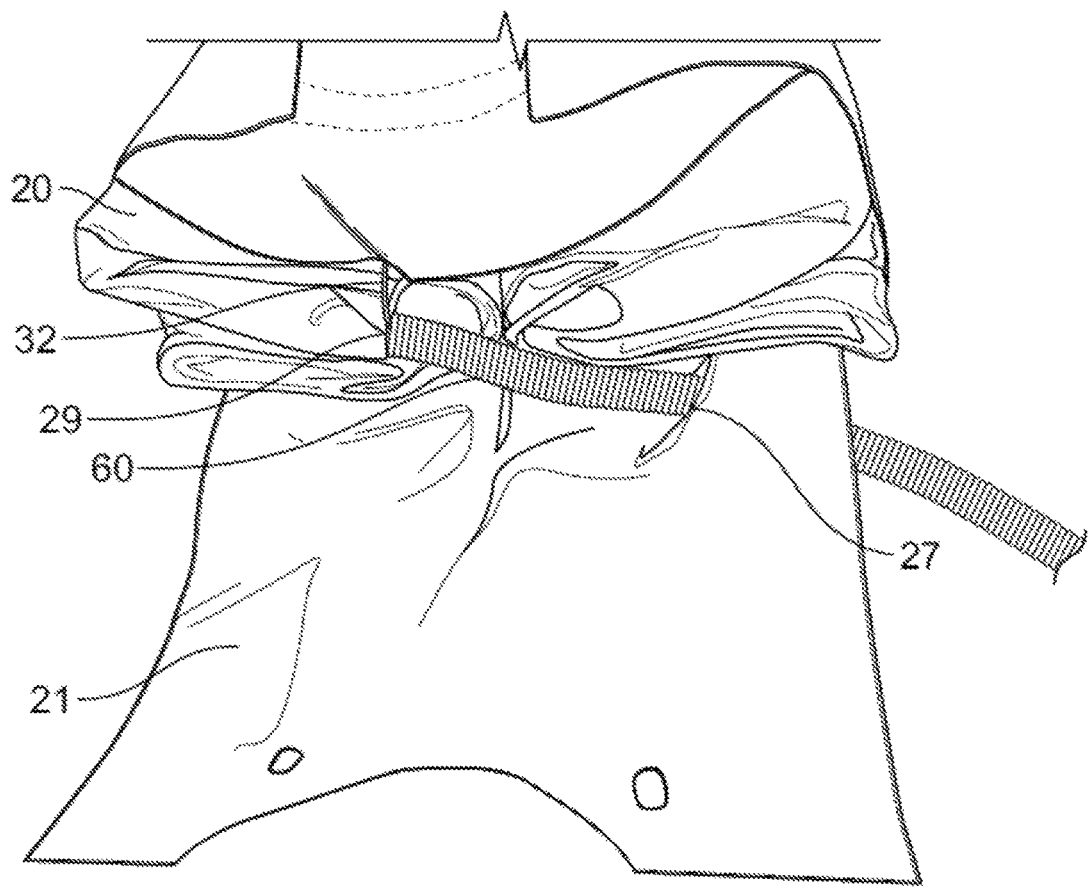
FIG. 13 is a side view of the folded airbag cushion with the conduit passing through the cushion wrap.

With reference to FIGS. 11 and 12, cross sectional views of the pin puller mechanism 40 are shown. As illustrated in FIG. 11, the pin puller mechanism 40 is shown in an extended position with the pin or piston 42 projecting outwardly from the base of the pin puller mechanism 40. On activation of the pyrotechnic actuator the pin 42 is retracted internally of the pin puller mechanism 40 by gases that are expelled into a chamber 41 pushing against a plate 43 causing the piston 42 to be withdrawn back into the mechanism 40, as illustrated the entire device pulls backward to the clip apertures 44 on activation as shown in FIG. 12. When the pin puller is activated, the vent connector 32 which is looped about the piston 42 is released. The vent connector 32 having a looped pin that encircles the piston is held there by the piston 42 until the pyrotechnic actuator is fired. It should be understood that while shown as a pyrotechnic device mounted on a lower external surface of the housing structure 14, it is also possible that this pin puller mechanism 40 could be an electric solenoid that is simply activated electronically causing the piston 42 to retract.

With reference to FIGS. 13-16. The present invention is shown in more detail where the airbag cushion 20 has a dust cover 21 that is appended to the side of the airbag cushion 20. Extending through an opening 27 in the dust cover 21 is a flexible conduit 60, this flexible conduit 60 extends from the vent cover 30 of the present invention airbag cushion 20 and is shown extending into the airbag cushion 20 at location 29.

Figure 14:
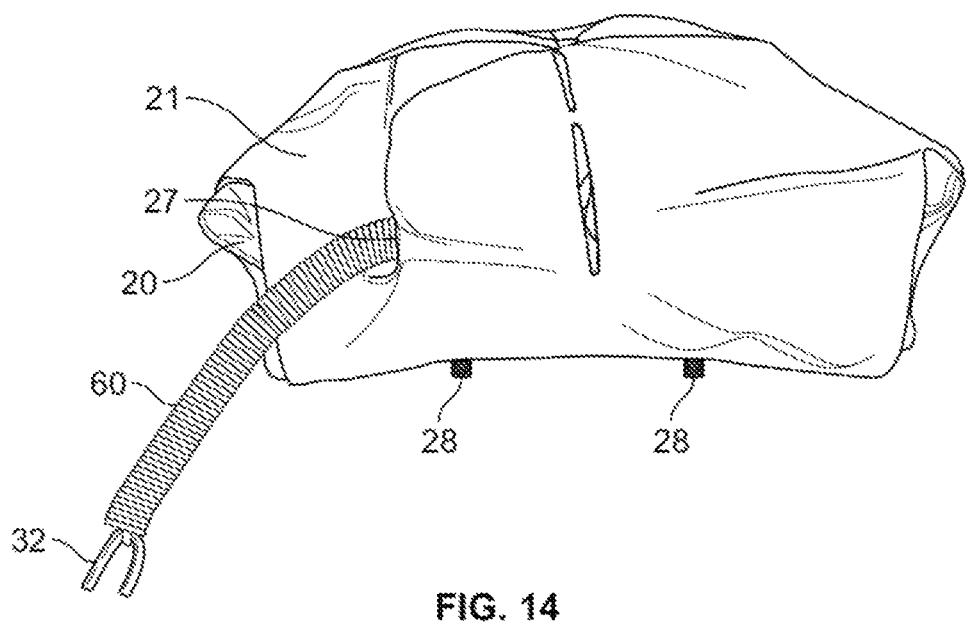
FIG. 14 is a side view of the folded over cushion wrap showing the conduit with vent connector and attachment studs.

As illustrated in FIG. 14, this conduit 60 is then folded internally of the airbag cushion 20 and dust cover 21. The conduit 60, as shown, has the vent connector 32 extending internally of the conduit 60. Projecting from a lower surface of the airbag 20 are the mounting pins 28 that are adapted to fit through the holes 17 in the housing structure 14 and to be fastened thereto securely so that the airbag 20 on inflation stays assembled the housing structure 14.

Figure 15:
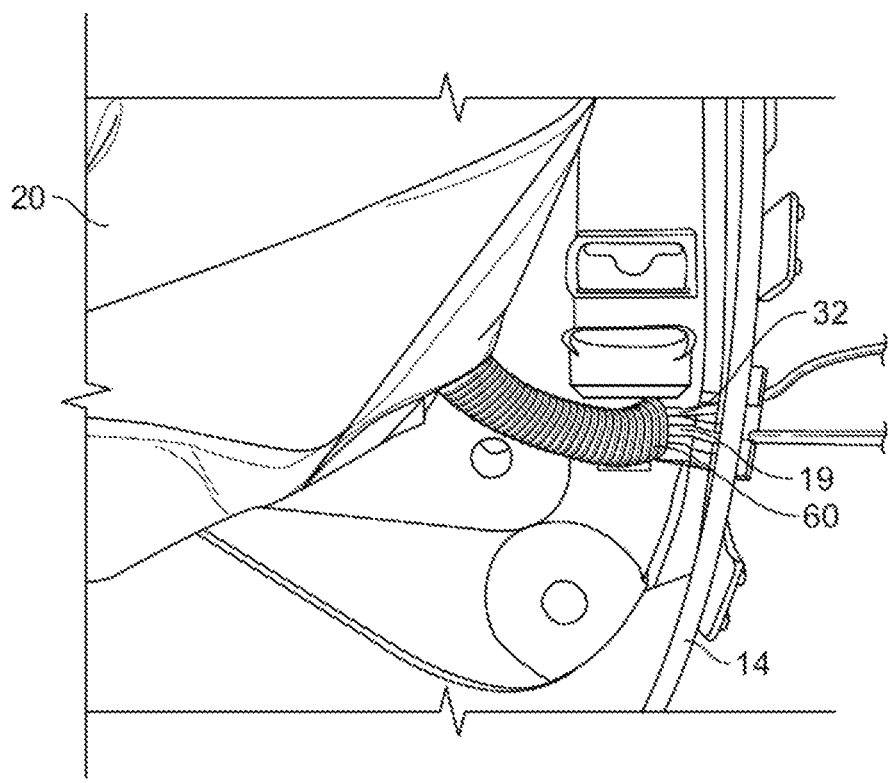
FIG. 15 is a partial top view of the airbag cushion and lower module housing showing the conduit with tether routed through housing.
Figure 16:
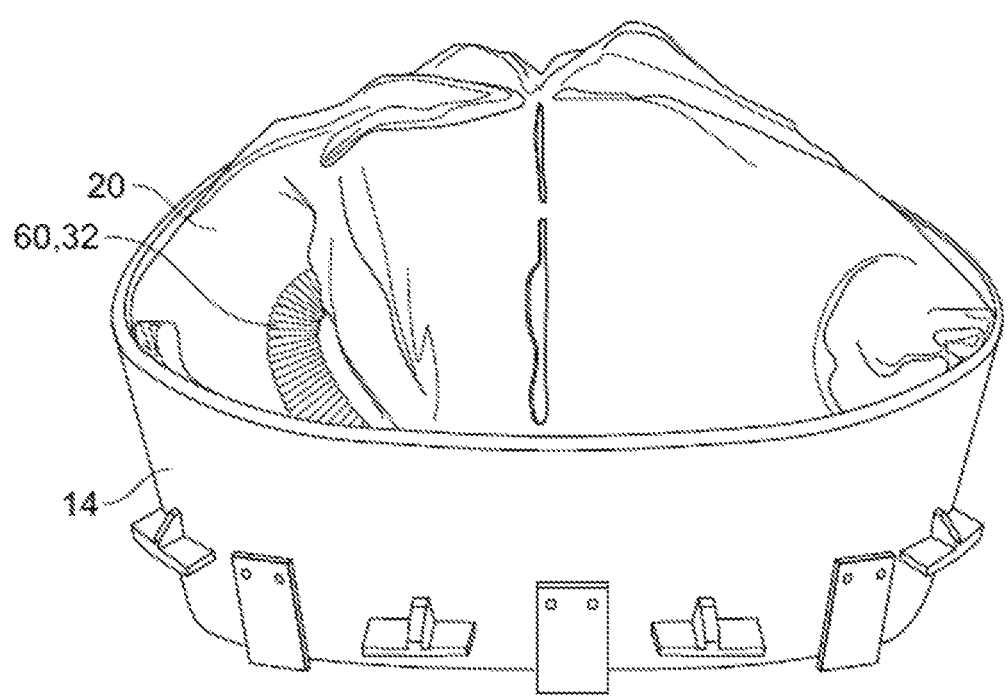
FIG. 16 is a side perspective view of the airbag cushion with conduit and vent connector packed into the housing.

With reference to FIG. 15, it is illustrated that the airbag assembly 20 when packed into the receiving chamber as defined by the walls of the housing structure 14 has the conduit 60 and vent connector 32 extending downwardly through an opening 19 to the pin puller mechanism 40. This is better illustrated in FIG. 16 where the entire airbag assembly 20 is shown folded and neatly packed into the lower housing structure 14 with the conduit 60 and vent connector 32 extending along the side of the airbag 20. Upon activation of the airbag during deployment, an inflator 25, is ignited causing inflation gases to fill the airbag cushion 20. Upon inflation a tear seam provided in the top cover 12 of the airbag assembly 10 is torn and the airbag projects outwardly towards the occupant. As the airbag cushion 20 is deploying, vent connector 32 inside the conduit 60 holds the vent cover 30 in a closed position. This closed position is maintained until a sensor activates the actuator 50 on the pin puller mechanism 40. When this signal is provided the pyrotechnic actuator 50 will fire causing the piston or pin 42 to withdraw. When the piston 42 withdraws, the looped end of the vent connector 32 will be released from the pin puller mechanism 40 in such a fashion that the vent cover 30 is no longer constrained to the closed position and will be allowed to open and expel inflation gases from inside the airbag cushion 20.

What the present invention provides is a passageway or conduit 60 that enables the vent connector 32 to be positioned through the airbag module assembly 10. When the airbag cushion 20 is in the folded and packed position, the vent connector 32 can be fed through the conduit 60 and extend outwardly through the hole 19 in the housing structure 14 to make its attachment to the pin puller mechanism 40. These features enable the device to be assembled reliable, even when the cushion 20 is relatively oversized for the housing structure 14. This is particularly true in the illustrated embodiment where a circular cushion 20 is being positioned in a triangular shaped airbag module housing assembly 10. In this situation, the airbag cushion 20 must be folded several times and compacted tightly into the lower housing structure 14, and in doing so projects upwardly in such a fashion that the top cover 12 must encircle the airbag cushion 20 and compress it tightly. Under these conditions, in the absence of the conduit 60, the vent connector 32 has the potential of being pinched or snagged so that it will not perform properly in the event of airbag deployment. The use of the conduit 60 provides a tubing that is sufficiently open internally that the vent connector 32 can be fed through the conduit 60 with relative ease facilitating assembly and ensuring the conduit 60 and vent connector 32 do not pinch or get hung up on any structure during airbag deployment. As shown, the conduit 60 while being partially inside the airbag cushion 20 on the folded portion, a large portion of the conduit 60 lays generally along the side of the airbag cushion when the folded. Therefore, it is free from obstructions internal of the airbag module that might cause the vent connector 32 to not properly follow the airbag during airbag inflation. The conduit 60 as shown is a flexible corrugated plastic material, but could be any flexible material, smooth or corrugated so long as the internal diameter maintains the lumen open and unkinked so the tether or rope 32 can easily slide through.

Figure 17:
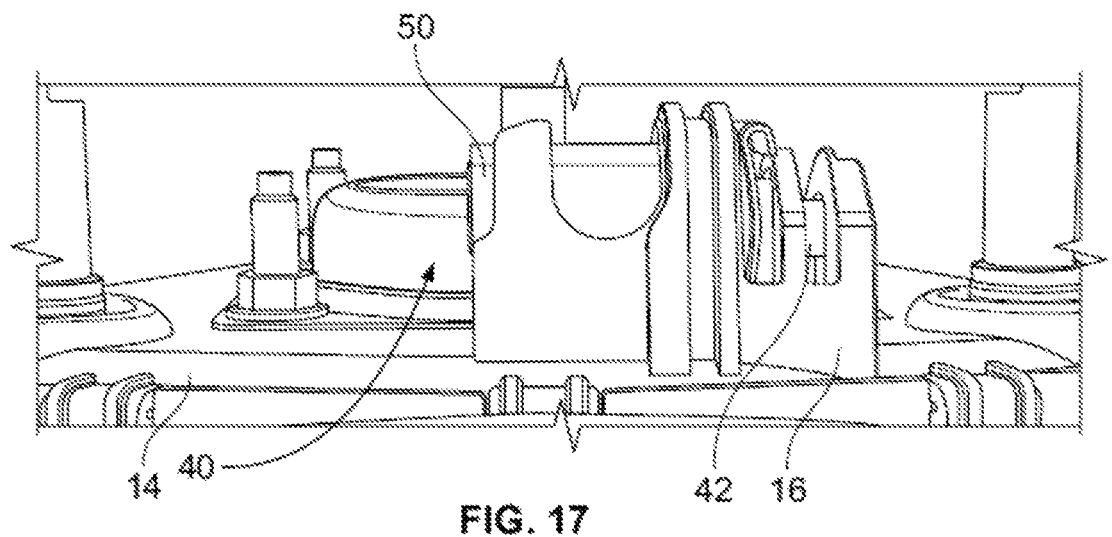
FIG. 17 is a side view of the pin puller mechanism and the bottom of the module housing.
Figure 18:
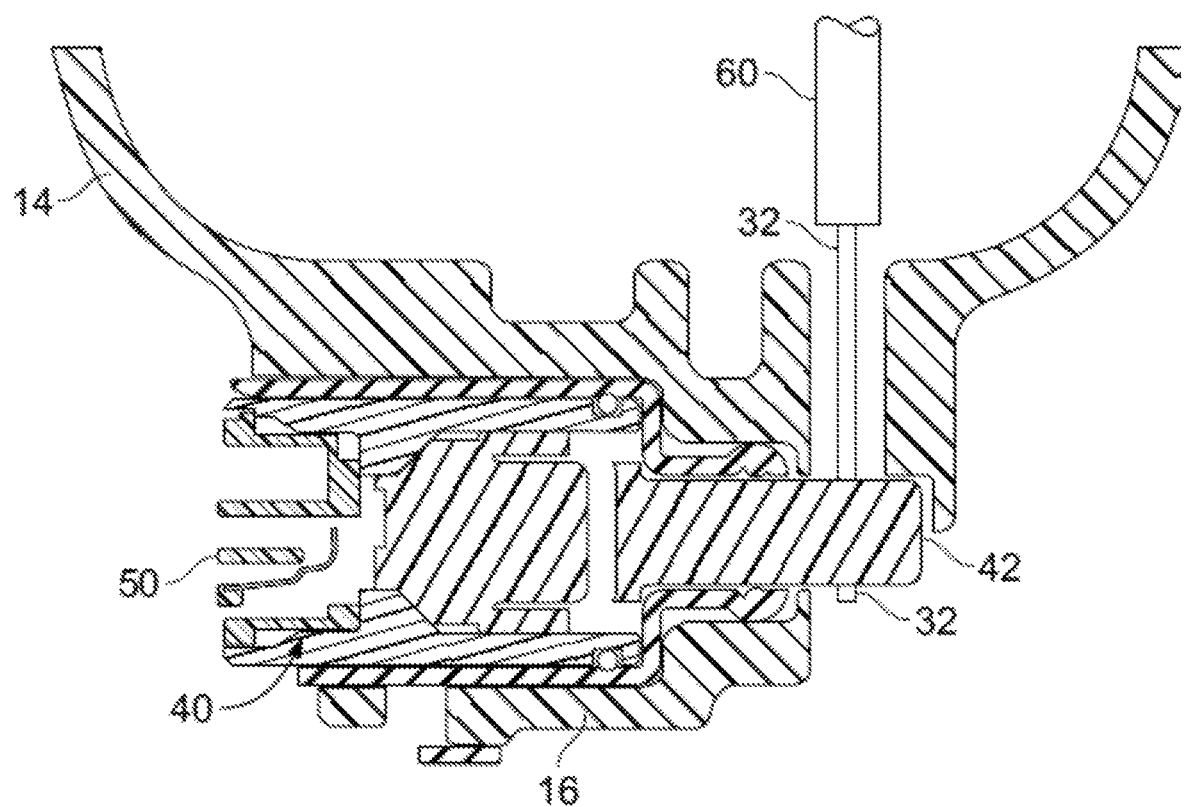
FIG. 18 is a cross sectional view of the vent connector (tether rope or wire) looped end external past the conduit and attached to the pin of the pin puller mechanism.

FIGS. 17 and 18 show the pin puller mechanism 40 and the bracket 16 of the airbag module assembly. FIG. 17 is a view showing the how the pin puller mechanism 40 with actuator 50 would be installed in the bracket assembly 16 by retaining clip and apertures 44. FIG. 18 shows the pin puller mechanism 40 installed in the bracket 16 on the lower housing structure 14 with the vent connector 32 extending from the conduit 60 and looped around the retractable pin 42.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An airbag module assembly comprising:
   an airbag cushion with at least one vent;
   a housing structure for receiving the airbag cushion;
   a housing cover for attachment to the housing structure;
   a vent connector connected to the vent;
   a pin puller mechanism with a retractable pin;
   a flexible conduit extending from the airbag cushion adjacent the vent to the pin puller mechanism; and
   wherein the vent connector extends inside the conduit to a looped end for attachment to the retractable pin.

2. The airbag module assembly of claim 1 wherein the vent connector is a rope or wire.

3. The airbag module assembly of claim 1 wherein the vent is initially in a closed position during deployment of the airbag.

4. The airbag module assembly of claim 1 wherein the airbag cushion is folded about the conduit during assembly.

5. The airbag module assembly of claim 1 wherein the vent connector is configured to pass through the flexible conduit when the airbag cushion is folded.

6. The airbag module assembly of claim 1 wherein the pin puller mechanism is attached to a mounting bracket or clip external of the housing structure.

7. The airbag module assembly of claim 1 wherein the pin puller mechanism is attached to a mounting bracket or clip inside the housing structure.

8. The airbag module assembly of claim 1 wherein the flexible conduit extends externally along an outer surface of the airbag cushion.

9. The airbag module assembly of claim 1 wherein the conduit passes through an opening in the housing.

10. The airbag module assembly of claim 1 wherein the conduit is fixed to the airbag cushion at an end near the vent.

11. The airbag module assembly of claim 1 wherein the conduit has a length extending from the attached end on the vent to the housing and sufficient to follow along the outer surface of the inflated airbag on deployment.

12. The airbag module assembly of claim 1 wherein the looped end of the vent connector releases from the pin on activation of the pin puller mechanism.

13. The airbag module assembly of claim 1 wherein the release of the vent connector allows the closed airbag vent to open to vent inflation gases.

14. The airbag module assembly of claim 1 wherein the pin puller mechanism has a pyrotechnic actuator.

15. The airbag module assembly of claim 1 wherein the pin puller mechanism has a solenoid actuator.

* * * * *